June 19, 1945. E. E. HABIB ET AL 2,378,702

MANUFACTURE OF ARTICLES FROM LIQUID DISPERSIONS

Filed Nov. 16, 1943

INVENTORS:
*EMILE E. HABIB* AND
*GORDON E. GOTT*
by Theodore C. Browne
Atty.

Patented June 19, 1945

2,378,702

UNITED STATES PATENT OFFICE 2,378,702

MANUFACTURE OF ARTICLES FROM LIQUID DISPERSIONS

Emile E. Habib and Gordon E. Gott, Arlington, Mass., assignors to Dewey and Almy Chemical Company, North Cambridge, Mass., a corporation of Massachusetts Application November 16, 1943, Serial No. 510,445

5 Claims. (Cl. 18—58)

This invention relates to the manufacture of hollow rubber articles and more particularly to the manufacture of meteorological, radiosonde, and life-saving balloons and the like by a process in which suitably shaped molds are dipped in a liquid dispersion of rubber.

In our co-pending application, Serial No. 510,442, filed on the same day as the present application, we have described a coagulant dipping process for the manufacture of rubber objects in which the formed deposit is stripped from the mold while it is still a soft and plastic gel and is then inflated to form a thin spherical balloon envelope. The present invention is concerned with improvements in the process described in said application which increase the factor of safety in the handling of such weak gels and which produce a tapered reinforced portion adjacent the neck of the balloon.

Balloons used for meteorological studies and for supporting radio antennas must withstand the distorting influence of air currents in flight and must in addition have a neck which is strong enough, and strongly enough attached to the body, to carry the weight of a radiosonde or withstand the strain from the pull of the antenna. The process described in detail in our co-pending application referred to produces such balloons but, as suggested above, to secure this result the balloons must be stripped from the molds while they are still soft and plastic and must subsequently be washed, inflated, and otherwise handled.

It is an object of the present invention to improve the dipping process of our co-pending application referred to to give balloon gel neck portions which will with greater certainty withstand the strain of being stripped from the mold and will be less susceptible to damage in subsequent handling and inflation. A further object is to form balloons having a tapered reinforced portion adjacent the neck of the balloon.

We have found that distortion and scuffing during stripping and subsequent handling and inflation of the neck portion of the soft plastic gels produced in the process of the application referred to can be materially reduced and the tear-resistance of the neck improved if those portions of the gel which are intended not to be expanded are so treated that a considerable proportion of the water in the gel is removed. By use of the present improvements more uniform necks which are less susceptible to damage by handling and which hold their dimensions better may be formed, and, if the water is removed from the neck before the gel is stripped from the mold, the neck may be stretched to allow the article to be stripped from the form with less danger of tearing the gel. By use of the inflation procedure of the present invention balloons which are less likely to fail in use by tearing out of the neck are produced.

We accomplish these results in a manner which is best illustrated by reference to the accompanying drawing, in which Figure 1 shows the mold after it is withdrawn from the dispersion covered with a formed deposit of rubber;

In the manufacture of balloons in accordance with the present process a suitably shaped mold 1 is provided on its outer surface with a coating of coagulant 2 by dipping the mold in a bath of coagulant. The coagulant-coated mold is then dipped in a conventional, compounded, rubber dispersion and allowed to dwell therein for the time required to produce on its surface a deposit of rubber gel 4 of the desired thickness.

Figure 1:
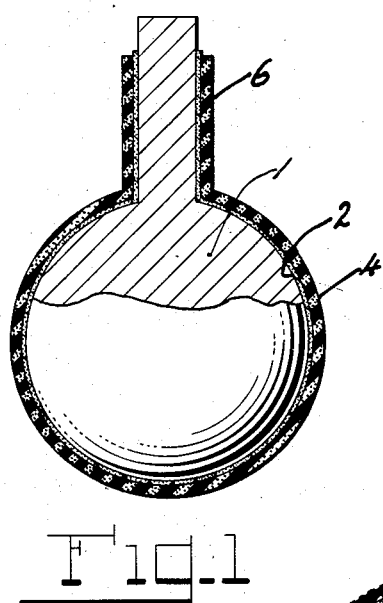
Figure 2:
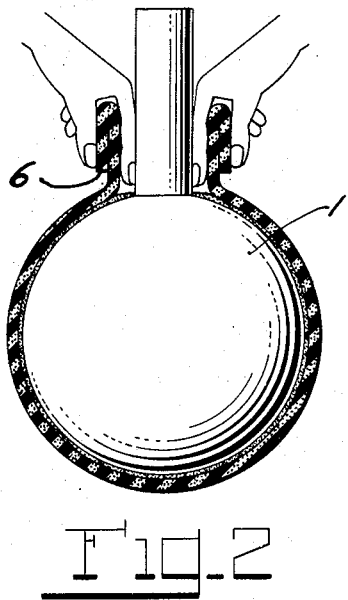
Figure 2 illustrates one operation in the step of removing water from the formed deposit.
Figure 3:
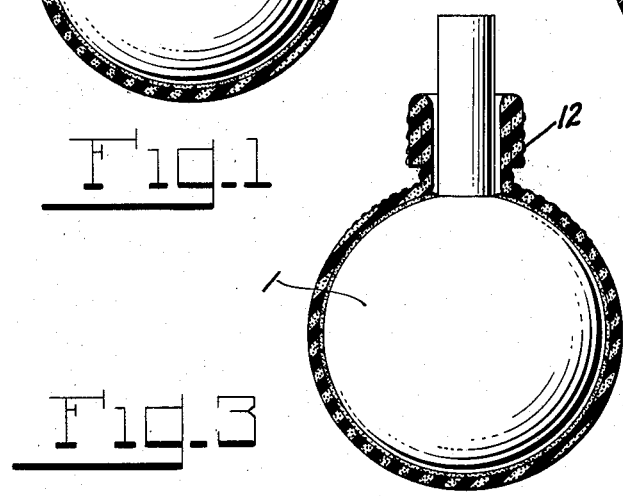
Figure 3 illustrates a subsequent operation in the step of removing water from the formed deposit.
Figure 4:
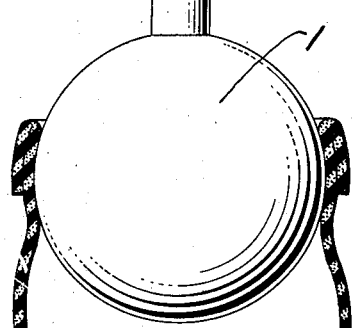
Figure 4 illustrates the step of stripping the gel from the mold.

After the mold 1 with its coagulated coating of rubber gel 4 has been removed from the rubber dispersion, the neck portion 6 of the gel is treated to initiate syneresis. Various methods of initiating syneresis are known, and any suitable method may be used in the present process. We prefer to initiate syneresis by working or stretching the neck. Working may be a simple kneading operation such as grasping the neck and working the fingers in and out, or any treatment which will alternately compress and release the gel material. Stretching can conveniently be done by hand by pulling the gel in the neck out and letting it return. After either of these operations, the serum begins to bleed out of the neck, as illustrated by the drops of serum 12 shown in Figure 3; bleeding will continue for a short time after the neck has been released. Whatever serum is exuded is removed by carefully wiping the neck. The working or stretching treatment is repeated if the amount of serum removed by the first working or stretching is insufficient. After a substantial amount of syneretic serum has been removed from the neck, the gel is stripped from the mold by stretching its neck and sliding it downwardly off the mold as illustrated in Figure 4.

Figure 5:
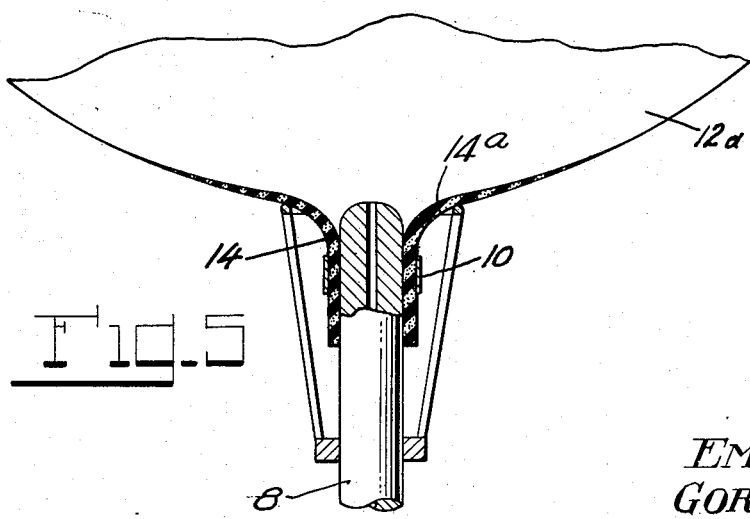
Figure 5 shows the expansion of the gel by inflation.

The stripped gel is placed on an inflating nozzle 8 arranged in a vertical position with its opening facing upwardly, as illustrated in Figure 5. A broad band of tape 10 is tied tightly around the gel neck as shown in Figure 5. The tape holds the gel on the nozzle and at the same time secures the end portion of the neck so that it cannot stretch during the inflation. Air is then turned into the gel. As a consequence of the tying, gel 14 flares out into the body of the balloon with a tapered cross section forming a tapered reinforced portion 14a integral with the body 12a of the balloon. The reinforced portion 14a is substantially as thick where it joins the neck as the neck itself and tapers gradually down to the thickness of the balloon body proper. The size of the reinforced portion is determined by the position on the gel neck at which the band 10 is tied, larger portions being produced by tying the band nearer the end of the neck and further from the juncture of the worked portion and body portion. In general, the reinforced portion occupies an area, varying with the size of the balloon, from several inches to a foot in diameter on the balloon surface and gives sufficient strength to withstand any wind strain to which the balloon may be subjected.

We believe that the toughening of the freshly deposited gel as a result of the treatment of the present invention is explained by the following:

Since the appearance of the Beckmann patent, U. S. No. 1,745,657, dated February 4, 1930, it has been recognized that a gel is formed when rubber latex coagulates and that gel formation does not represent an exact reversal of phase; that is, the water is not dispersed in the rubber in the same sense that immediately beforehand the rubber was dispersed in the water, but rather that the water and the rubber both become continuous phases. The production of a balloon of large size and good sphericity by inflation of a gel depends upon the fact that a very considerable amount of the water that originally made up the continuous phase of the dispersion is conserved in the gel as interstitial water. Thus, the rubber aggregates, in taking up their new positions in the expanding envelope, slide on water films. The result is that the gel in expanding undergoes plastic deformation and, until the water films become so thin that they break and allow the rubber aggregates to touch, there is no elastic distortion.

The syneresis may be brought about by other means than working or stretching the gel, for example, by immersing the neck in hot water, but we find it most convenient to initiate syneresis by stretching or kneading the gel, allowing it to return to its original position and remain in relaxed condition while the serum bleeds out. If the necks are dipped in hot water either before or after stripping and the expressed serum swabbed off, the balloon may be handled in the same way as was described for the process in which syneresis was initiated by mechanical means.

After the gel has been inflated to its desired diameter, it is dried in expanded condition, and, if desired, vulcanized simultaneously with the drying process or subsequently and after the balloon has been deflated.

While the herein-described process is particularly applicable to polymerized halogen butadiene-1,3 and natural rubber, we believe it to be applicable to other elastomers capable of being made into liquid dispersions from which tear-resistant, coherent gels can be coagulated. Accordingly, in the foregoing specification and claims, we have used the word "rubber" in an inclusive sense.

We claim:

1. The method of making a hollow rubber article having a neck portion and a body portion which comprises dipping a coagulant-coated mold of smaller size than the completed article in a liquid dispersion of rubber to form a deposit of rubber gel thereon, withdrawing the mold from the dispersion, removing liquid from the neck portion only of the gel by initiating syneresis therein, stripping the deposited gel from the mold by stretching it while the deposit has enough water to allow plastic flow in the areas which are to be enlarged, enlarging the body portion while a substantial proportion of interstitial water remains in the body portion, and drying the enlarged gel.

2. The method of making a hollow rubber article having a neck portion and a body portion which comprises dipping a coagulant-coated mold of smaller size than the completed article in a liquid dispersion of rubber to form a deposit of rubber gel thereon, withdrawing the mold from the dispersion, removing liquid from the neck portion only of the gel by mechanically working it, stripping the deposited gel from the mold by stretching it while the deposit has enough water to allow plastic flow in the areas which are to be enlarged, enlarging the body portion while a substantial proportion of interstitial water remains in the body portion, and drying the enlarged gel.

3. The method of making a hollow rubber article having a neck portion and a body portion which comprises dipping a coagulant-coated mold of smaller size than the completed article in a liquid dispersion of rubber to form a deposit of rubber gel thereon, withdrawing the mold from the dispersion, removing liquid from the neck portion only of the gel by immersing it in warm water, stripping the deposited gel from the mold by stretching it while the deposit has enough water to allow plastic flow in the areas which are to be enlarged, enlarging the body portion while a substantial proportion of interstitial water remains in the body portion, and drying the enlarged gel.

4. The method of making a hollow rubber article having a neck portion and a body portion which comprises dipping a coagulant-coated mold of smaller size than the completed article in a liquid dispersion of rubber to form a deposit of rubber gel thereon, withdrawing the a deposit of rubber gel thereon, withdrawing the mold from the dispersion, removing liquid from the neck portion only of the gel by initiating syneresis therein, stripping the deposited gel from the mold by stretching it while the deposit has enough water to allow plastic flow in the areas which are to be enlarged, securing at least the end portion of the neck against stretching, and inflating the body portion while the neck is so secured.

5. The method of making a rubber article which comprises providing a mold having a first portion corresponding in size and shape to one portion of the article and another portion of much smaller size than the corresponding part of the article, dipping the mold in a liquid dispersion of rubber to form a deposit of rubber gel thereon, withdrawing the mold from the dispersion, removing water only from the portion of the gel corresponding to said first part of the mold by initiating syneresis therein, stripping the deposited gel from the mold by stretching it while the deposit has enough water to allow plastic flow in the areas which are to be enlarged, and enlarging the part of the gel corresponding to said other portion of the mold while it contains a substantial part of its interstitial water.

EMILE E. HABIB.
GORDON E. GOTT.

CERTIFICATE OF CORRECTION.

Patent No. 2,378,702.  June 19, 1945.

EMILE E. HABIB, ET AL.

It is hereby certified that error appears in the printed specification of the above numbered patent requiring correction as follows: Page 2, second column, lines 45 and 46, claim 4, strike out the words and comma "withdrawing the a deposit of rubber gel thereon,"; and that the said Letters Patent should be read with this correction therein that the same may conform to the record of the case in the Patent Office.

Signed and sealed this 11th day of September, A. D. 1945.

(Seal) Leslie Frazer

First Assistant Commissioner of Patents.